US012033115B2

United States Patent
Itozawa et al.

(10) Patent No.: US 12,033,115 B2
(45) Date of Patent: Jul. 9, 2024

(54) SHELF INVENTORY MANAGEMENT SYSTEM, SHELF INVENTORY MANAGEMENT METHOD, AND PROGRAM (71) Applicant: TOYOTA JIDOSHA KABUSHIKI KAISHA, Toyota (JP)

(72) Inventors: Yuta Itozawa, Nagoya (JP); Kunihiro Iwamoto, Nagakute (JP); Hirotaka Komura, Tokyo (JP); Yutaro Takagi, Tokyo (JP); Yoshiaki Nakamoto, Nisshin (JP); Junya Ota, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 17/560,659

(22) Filed: Dec. 23, 2021

(65) Prior Publication Data
US 2022/0270031 A1    Aug. 25, 2022

(30) Foreign Application Priority Data
Feb. 19, 2021   (JP) .................. 2021-025080

(51) Int. Cl.
*G06Q 10/087* (2023.01)
*G06Q 10/10* (2023.01)
(52) U.S. Cl.
CPC ................ *G06Q 10/087* (2013.01)
(58) Field of Classification Search
CPC ..... G06Q 10/087; G06Q 10/083; G01G 19/52
USPC ........................................ 705/28
See application file for complete search history.

(56) References Cited

U.S. PATENT DOCUMENTS

| 6,204,763 | B1 |   | 3/2001 | Sone |   |
|---|---|---|---|---|---|
| 9,120,622 | B1 | * | 9/2015 | Elazary | B66F 9/07 |
| 11,498,776 | B1 | * | 11/2022 | Sikka | G06N 5/048 |
| 2018/0075216 | A1 | * | 3/2018 | Nurse | E05B 45/00 |

FOREIGN PATENT DOCUMENTS

| CN | 104361039 | * | 10/2014 |
| CN | 109214751 | * | 8/2018 |
| JP | 2000065465 A | | 3/2000 |
| JP | 2000296904 A | | 10/2000 |
| JP | 2001141350 A | | 5/2001 |
| JP | 2003004368 A | | 1/2003 |
| JP | 2003222460 A | | 8/2003 |
| JP | 2004348445 A | | 12/2004 |
| JP | 2007106557 A | | 4/2007 |
| JP | 2014174791 A | | 9/2014 |

\* cited by examiner

*Primary Examiner* — Garcia Ade
(74) *Attorney, Agent, or Firm* — Dickinson Wright, PLLC (57) ABSTRACT

A shelf inventory management system includes: a shelf including storage boxes that is each identified; a first sensor that detects a mass change of the storage boxes; a management unit that manages an inventory of an article stored in each storage box, based on a detection result of the first sensor; and a terminal for notifying a user of information related to the article stored in each storage box. The management unit stores the article stored in each storage box and an expiration date related to consumption of the article in association with each other, and outputs to the terminal reminder information for notifying that the expiration date of the article is approaching, when a period until the expiration date of the article not detected by the first sensor falls below a predetermined standard.

11 Claims, 3 Drawing Sheets

SHELF INVENTORY MANAGEMENT SYSTEM, SHELF INVENTORY MANAGEMENT METHOD, AND PROGRAM

CROSS-REFERENCE TO RELATED APPLICATION

This application claims priority to Japanese Patent Application No. 2021-025080 filed on Feb. 19, 2021, incorporated herein by reference in its entirety.

BACKGROUND

1. Technical Field

The present disclosure relates to a shelf inventory management system, a shelf inventory management method, and a program.

2. Description of Related Art

There has been an issue that, after storing purchased consumables such as food on a shelf, the consumables are wasted without noticing an expiration date related to consumption of the consumables (expiration date, best-before date, use-by date, etc.).

In view of such an issue, Japanese Unexamined Patent Application Publication No. 2003-004368 (JP 2003-004368 A) discloses a refrigerator with an inventory management function that displays information warning that the expiration date is approaching when the number of days or time until the best-before date of the food is within a predetermined period.

SUMMARY

If the technology disclosed in JP 2003-004368 A is applied to a shelf provided with a plurality of storage boxes each storing an article, the storage box that stores the article with the approaching expiration date related to consumption cannot be specified. Therefore, it takes time and effort to take out the article with the approaching expiration date related to consumption from the shelf, and it is not easy to take out the article.

The present disclosure has been made in view of such circumstances, and provides a shelf inventory management system capable of specifying a storage location for an article with an approaching expiration date related to consumption.

A shelf inventory management system according to an aspect of the present disclosure includes: a shelf including a plurality of storage boxes each of which is identified; a first sensor that detects a mass change of the storage boxes; a management unit that manages an inventory of an article stored in each of the storage boxes, based on a detection result of the first sensor; and a terminal for notifying a user of information related to the article stored in each of the storage boxes. The management unit stores the article stored in each of the storage boxes and an expiration date related to consumption of the article in association with each other, and outputs to the terminal reminder information for notifying that the expiration date of the article is approaching, when a period until the expiration date of the article that is not detected by the first sensor falls below a predetermined standard. The reminder information includes storage box information indicating which of the storage boxes the article with the approaching expiration date is stored in.

A shelf inventory management method according to another aspect of the present disclosure is a shelf inventory management method for detecting by a first sensor a mass change of a plurality of storage boxes in a shelf provided with the storage boxes each of which is identified, and managing an inventory of an article stored in each of the storage boxes by using a computer based on a detection result of the first sensor. The shelf inventory management method includes: storing the article stored in each of the storage boxes and an expiration date related to consumption of the article in association with each other; and outputting to a terminal reminder information for notifying that the expiration date of the article is approaching, when a period until the expiration date of the article that is not detected by the first sensor falls below a predetermined standard, the terminal being used to notify a user of information related to the article stored in the shelf. The reminder information includes storage box information indicating which of the storage boxes the article with the approaching expiration date is stored in.

A program according to another aspect of the present disclosure is a program for detecting by a first sensor a mass change of a plurality of storage boxes in a shelf provided with the storage boxes each of which is identified, and managing an inventory of an article stored in each of the storage boxes by using a computer based on a detection result of the first sensor. The program stores the article stored in each of the storage boxes and an expiration date related to consumption of the article in association with each other. The program outputs to a terminal reminder information for notifying that the expiration date of the article is approaching, when a period until the expiration date of the article that is not detected by the first sensor falls below a predetermined standard, the terminal being used to notify a user of information related to the article stored in the shelf. The reminder information includes storage box information indicating which of the storage boxes the article with the approaching expiration date is stored in.

In the aspect of the present disclosure, when a period until the expiration date related to consumption of the article that is not detected by the first sensor falls below a predetermined standard, reminder information for notifying that the expiration date of the article is approaching is output to a terminal, the terminal being used to notify a user of information related to the article stored in the shelf. The reminder information includes storage box information indicating which of the storage boxes the article with the approaching expiration date is stored in. Therefore, the user can specify the storage location of the article with the approaching expiration date related to consumption based on the reminder information, and can easily take out the article from the shelf.

The first sensor may be provided for each row of the shelf. The shelf inventory management system may further include a second sensor that detects that each of the storage boxes is pulled out from the shelf. With such a configuration, the number of mass sensors can be reduced and the cost increase can be suppressed as compared with the case where the mass sensor (first sensor) is provided in each of the storage boxes.

The shelf may be provided with a lock mechanism for locking each of the storage boxes, and each of the storage boxes may be locked while the article is stored and unlocked when the article is taken in and out. The second sensor may detect that each of the storage boxes has been unlocked. With such a configuration, it can be easily determined that the storage box has been pulled out from the shelf.

The terminal may include a display unit able to display the reminder information. The reminder information may include identification information of the article with the approaching expiration date, the expiration date of the article, and an amount of the article, and may be collectively displayed on the display unit. Such a configuration provides excellent convenience for the user.

The reminder information may include a method of consuming the article with the approaching expiration date, and may be collectively displayed on the display unit. With such a configuration, the user's sense of coercion to consume the article with the approaching consumption-related expiration date can be reduced, and the quality of life of the user is improved.

The present disclosure can provide a shelf inventory management system capable of specifying a storage location for an article with an approaching expiration date related to consumption.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments will be described in detail with reference to the drawings. In each drawing, the same or corresponding elements are designated by the same reference signs, and duplicate descriptions are omitted as necessary for the sake of clarity.

First Embodiment

Configuration of Shelf Inventory Management System

Figure 1:
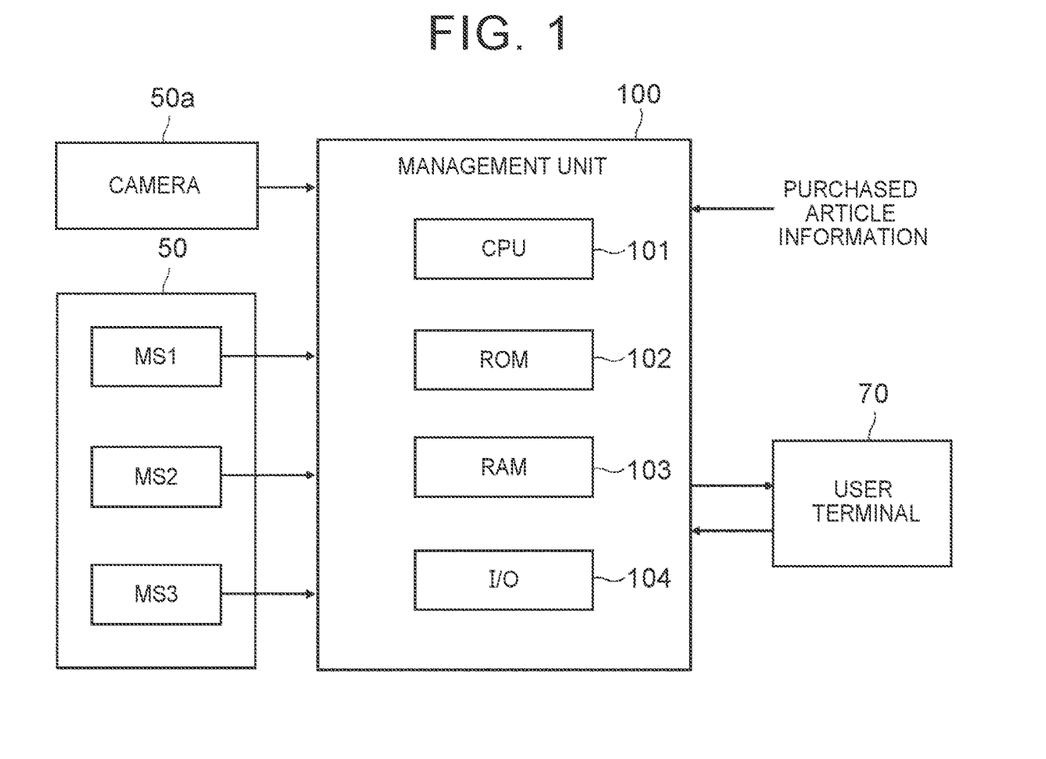
FIG. 1 is a block diagram of a shelf inventory management system according to a first embodiment.

First, a shelf inventory management system according to a first embodiment will be described with reference to FIG. 1. FIG. 1 is a block diagram of the shelf inventory management system according to the first embodiment. The shelf inventory management system is a system that manages the inventory of consumables stored in each of a plurality of storage boxes accommodated in a shelf, by using a computer. As shown in FIG. 1, the shelf inventory management system according to the present embodiment includes a shelf 50, a camera 50a, a user terminal 70, and a management unit 100.

Figure 2:
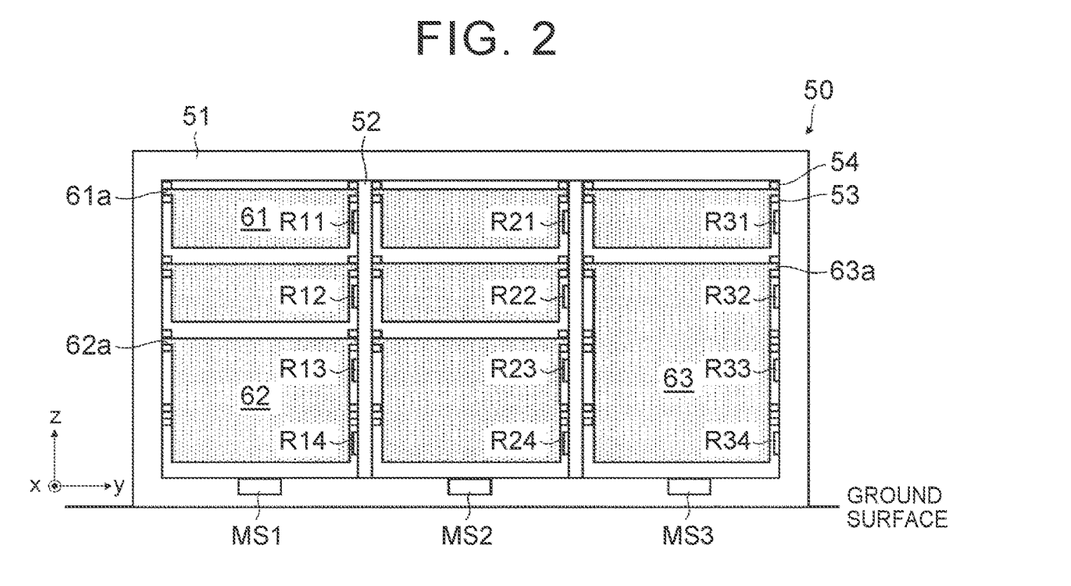
FIG. 2 is a schematic front view showing an example of a configuration of a shelf 50.

The shelf 50 is a shelf for storing the consumables, and is installed in, for example, a living space of a house. In this specification, the house includes an apartment house, an office building, and the like, and the living space includes an office space. Here, FIG. 2 is a schematic front view showing an example of a configuration of the shelf 50. As shown in FIG. 2, the shelf 50 includes storage boxes 61 to 63 for storing the consumables. Further, as shown in FIGS. 1 and 2, the shelf 50 includes mass sensors MS1 to MS3 for detecting the consumables taken out from the storage boxes 61 to 63. The details of the shelf 50 will be described later with reference to FIG. 2.

The camera 50a is a camera that monitors the shelf 50. The camera 50a is provided, for example, on the shelf 50 itself or around the shelf 50. As shown in FIG. 1, an image acquired by the camera 50a is transmitted to the management unit 100. Based on the image acquired by the camera 50a, the management unit 100 can determine the user who has taken out the consumables from the shelf 50. It should be noted that the camera 50a is not essential.

As shown in FIG. 1, the user terminal 70 is a terminal for notifying the user of information and the like related to the consumables stored in the shelf 50. The user terminal 70 is not limited as long as the user terminal 70 has a function as a computer, and is, for example, a mobile communication terminal such as a smartphone or a tablet terminal, a personal computer (PC), or the like. The user terminal 70 may be a separate terminal for each user or a terminal common to all users. The user terminal 70 includes a display unit capable of displaying various types of information.

Although not shown, the user terminal 70 includes, for example, a calculation unit such as a central processing unit (CPU) and a storage unit such as a random access memory (RAM) and a read only memory (ROM) in which various control programs, data, and the like are stored. That is, the user terminal 70 has a function as a computer, and performs various processes based on the above-mentioned various control programs and the like.

The management unit 100 is a computer that manages the inventory of the consumables stored in each of the storage boxes 61 to 63 on the shelf 50. The management unit 100 is, for example, a server such as a cloud server, and is provided separately from the shelf 50 and the user terminal 70. The management unit 100 is not limited to a server as long as the management unit 100 has a function as a computer, and may be, for example, a mobile communication terminal such as a smartphone or a tablet terminal, a PC, or the like. The management unit 100 may be provided integrally with the shelf 50, or may be provided integrally with the user terminal 70.

As shown in FIG. 1, the management unit 100 is wirelessly or wiredly connected to the shelf 50, the camera 50a, and the user terminal 70 so as to be able to communicate with each other. The management unit 100 includes a CPU 101, a ROM 102, a RAM 103, and an input/output (I/O) 104 as hardware. That is, the management unit 100 has a function as a computer, and performs various processes based on the above-mentioned various control programs and the like.

The CPU 101 is, for example, an arithmetic unit that performs control processing, arithmetic processing, and the like. The ROM 102 is, for example, a storage unit that stores a control program, an arithmetic program, and the like executed by the CPU 101. The RAM 103 is a storage unit that temporarily stores processed data and the like. The RAM 103 stores, for example, identification information (for example, the name of the consumable, that is, the trade name), the mass, and the expiration date related to consumption of each consumable stored in each of the storage boxes 61 to 63 on the shelf 50. Here, the "expiration date related to consumption" includes, for example, the best-before date and the expiration date for consumables such as food, the use-by date for consumables other than food, and the like, and is hereinafter referred to as "consumption-related expiration date". The I/O 104 is an input/output device that inputs data and signals from the outside and outputs the data and signals to the outside.

As described above, the management unit 100 stores inventory information such as the identification information and the mass of each consumable stored in each storage box 61 to 63 on the shelf 50. The management unit 100 determines which consumable was taken out from which of the storage boxes 61 to 63, and updates the inventory information of the storage boxes 61 to 63 from which the consumable has been taken out.

Specifically, as shown in FIG. 1, the management unit 100 determines the consumables taken out from the shelf 50, based on the mass change that is the detection result of the mass sensors MS1 to MS3 provided for each row of the shelf 50. Further, the management unit 100 determines from which of the storage boxes 61 to 63 the consumables were taken out based on the fact that any of the storage boxes 61 to 63 accommodated in the row for which the mass change is recognized is pulled out from the shelf 50.

On the other hand, as shown in FIG. 1, the management unit 100 manages the consumables stored in each of the storage boxes 61 to 63 on the shelf 50, based on purchased article information, and updates the inventory information. In this way, the management unit 100 manages the inventory of each of the storage boxes 61 to 63 on the shelf 50. The purchased article information is information related to the purchased consumable, includes at least the identification information and the mass of each purchased consumable, and is associated with each consumable. That is, the purchased article information is information that serves as the source of the inventory information when the consumable is stored in any of the storage boxes 61 to 63. In the shelf inventory management system according to the present embodiment, the purchased article information includes the consumption-related expiration date.

Further, the management unit 100 stores each consumable stored in each of the storage boxes 61 to 63 on the shelf 50 and the consumption-related expiration date of the consumable in association with each other. When the period until the consumption-related expiration date of each consumable stored in each of the storage boxes 61 to 63 without being detected by the mass sensors MS1 to MS3 falls below the predetermined standard, the management unit 100 outputs reminder information to the user terminal 70. The reminder information is information that notifies that the expiration date of the consumable is approaching. The reminder information is, for example, character information, voice information, image information, and the like, and may be a combination thereof.

Here, the reminder information includes storage box information indicating which of the storage boxes 61 to 63 the consumable with the approaching consumption-related expiration date is stored in. As will be described later, each of the storage boxes 61 to 63 is identified by the identification information, and the storage location is also managed. Therefore, the user can specify the storage location of the consumable with the approaching consumption-related expiration date based on the reminder information, and can easily take out the consumable from the shelf 50. The reminder information can reduce consumables that are discarded without being consumed, such as food waste.

The reminder information may include the identification information, the consumption-related expiration date, and the amount of the consumable with the approaching consumption-related expiration date, and may be collectively displayed on the display unit of the user terminal 70. Such a configuration provides excellent convenience for the user.

The reminder information may also include a method of consuming the consumable with the approaching consumption-related expiration date, and may be collectively displayed on the display unit of the user terminal 70. For example, when the consumable is food, the reminder information may include a recipe of a cooking method or the like. By presenting the consumption method, the user's sense of coercion to consume the consumable with the approaching consumption-related expiration date can be reduced, and the quality of life (QOL) of the user is improved. A different consumption method may be presented for each user based on the consumption trend of consumables of each user.

As described above, when the period until the consumption-related expiration date of each consumable stored in each of the storage boxes 61 to 63 without being detected by the mass sensors MS1 to MS3 falls below the predetermined standard, the reminder information is output to the user terminal 70. The reminder information includes the storage box information indicating which of the storage boxes 61 to 63 the consumable with the approaching consumption-related expiration date is stored in. Therefore, the user can specify the storage location of the consumable with the approaching consumption-related expiration date based on the reminder information, and can easily take out the consumable from the shelf 50.

Configuration of Shelf 50

Here, details of the configuration of the shelf 50 will be described with reference to FIG. 2. As shown in FIG. 2, the shelf 50 includes a housing 51, partition plates 52, rails 53, lock mechanisms 54, the mass sensors MS1 to MS3, readers R11 to R14, R21 to R24, R31 to R34, and the storage boxes 61 to 63.

The right-handed xyz orthogonal coordinates shown in FIG. 2 are indicated for convenience to describe the positional relationship of the components. Generally, the z-axis positive direction is vertically upward, and the xy plane is a horizontal plane. FIG. 2 is a front view, and the storage boxes 61 to 63 are hatched for easy understanding. Further, the configuration of the shelf 50 shown in FIG. 2 is merely an example, and the configuration of the shelf 50 is not limited as long as the shelf 50 includes a plurality of storage boxes that is each identified.

The housing 51 constitutes the outer frame of the shelf 50. In the example shown in FIG. 2, the housing 51 has a frame structure in which a top plate provided on a side in the z-axis positive direction, a bottom plate provided on a side in the z-axis negative direction, side surface plates provided on a side in the y-axis positive direction and on a side in the y-axis negative direction are integrally formed. That is, the front and back surfaces of the housing 51 are open so that the storage boxes 61 to 63 can be taken in and out. Doors that can be opened and closed may be provided on the front and back surfaces of the open housing 51. Further, the front surface or the back surface of the housing 51 may be closed.

As shown in FIG. 2, the partition plates 52 are provided so as to be parallel to the side surface plates constituting the housing 51 (that is, parallel to the xz plane), and extend from the front surface to the back surface of the open housing 51. Here, the partition plates 52 are provided so that the distance between the side surface plates of the housing 51 and the adjacent partition plates 52 and the distance between the partition plates 52 are equal. In the example of FIG. 2, two partition plates 52 are provided, and three rows of the accommodation location for the storage boxes 61 to 63 are provided, but the number of partition plates 52 is not limited at all. Further, the configuration may be such that the partition plate 52 is not provided and one row of the accommodation location for the storage boxes 61 to 63 is provided.

As shown in FIG. 2, a plurality of pairs of the rails 53 is provided so as to extend in a depth direction (x-axis direction) and each of the rails 53 is arranged at equal intervals in a height direction (z-axis direction) on the inner surfaces of the side surface plates of the housing 51 and the partition plates 52. Here, the rails 53 are provided so as to rise substantially perpendicularly from the inner surfaces of the side surface plates of the housing 51 and the partition plates 52. In the example of FIG. 2, four pairs of the rails 53 are provided in each row, and four storage boxes 61 having the smallest size can be stored in each row.

As a matter of course, the number of the rails 53 is not limited at all. Further, the rails 53 may discontinuously extend in the depth direction (x-axis direction) as long as the rails 53 can support the storage boxes 61 to 63. Alternatively, instead of the rails 53, short supports may be arranged so as to be aligned in the depth direction (x-axis direction).

As shown in FIG. 2, the storage boxes 61 to 63 can be taken in and out by sliding protruding portions 61a to 63a on a pair of the rails 53 that faces adjacent to each other. The protruding portions 61a to 63a protrude outward from the storage boxes 61 to 63 in a width direction. In this way, the shelf 50 can accommodate all of the storage boxes 61 to 63 of a predetermined plurality of sizes, while supporting the storage boxes 61 to 63 so that the storage boxes 61 to 63 are slidable along each pair of the rails 53.

The lock mechanism 54 is provided on the upper side of each pair of the rails 53. The lock mechanism 54 locks the storage boxes 61 to 63 accommodated in the shelf 50 and their lids (not shown) to the housing 51, and thus can prevent the storage boxes 61 to 63 and the consumables stored inside the storage boxes 61 to 63 from being stolen. Details of the rails 53 and the lock mechanism 54 will be described later.

In the present embodiment, the storage boxes 61 to 63 of the predetermined plurality of sizes have the same width in the y-axis direction and the same depth in the x-axis direction. However, the storage boxes 61 to 63 have different heights in the z-axis direction. The height of the storage box 61 having the smallest size is designed so as to match the distance between the adjacent rails 53 in the z-axis direction. As a matter of course, the height of the storage box 61 having the smallest size is smaller than the distance between the rails 53 described above. The height of the storage box 62 having the intermediate size is designed to be about twice the height of the storage box 61. The height of the storage box 63 having the largest size is designed to be about three times the height of the storage box 61.

That is, the heights of the storage boxes 61 to 63 of the predetermined plurality of sizes are designed to be approximately an integral multiple of the distance between the adjacent rails 53 in the z-axis direction. In the example shown in FIG. 2, there are three types of sizes of the storage box, but two types or four or more types may be used. In the example of FIG. 2, in addition to the storage boxes 61 to 63, for example, a storage box having a height of about four times the height of the storage box 61 may be separately provided.

Consumables (not shown) such as groceries and daily necessities are stored inside the storage boxes 61 to 63. For example, when the consumables stored in the storage boxes 61 to 63 are taken out, the consumables are newly replenished.

Here, each storage box 61 to 63 is identified by the identification information such as characters, symbols, barcodes, two-dimensional codes, radio frequency identifiers (RFID), etc. that can be read by the readers R11 to R14, R21 to R24, and R31 to R34, for example. Therefore, the management unit 100 shown in FIG. 1 can manage the inventory status of the consumables for each of the storage boxes 61 to 63 on the shelf 50. The identification information is directly attached to or embedded in each of the storage boxes 61 to 63. In the example shown in FIG. 2, the identification information (not shown) is provided to the side surfaces of the storage boxes 61 to 63 in the y-axis positive direction.

In the row on the side in the y-axis negative direction of the shelf 50 shown in FIG. 2, four readers R11 to R14 are provided on the partition plate 52 below each pair of the rails 53. In the central row, four readers R21 to R24 are provided on the partition plate 52 below each pair of the rails 53. In the row on the side in the y-axis positive direction, four readers R31 to R34 are provided on the side surface plate of the housing 51 below each pair of the rails 53.

By reading the identification information of the storage boxes 61 to 63 with the readers R11 to R14, R21 to R24, and R31 to R34, the storage boxes 61 to 63 accommodated in the shelf 50 can be identified and the storage location can be detected. Here, the identification information may include the sizes of the storage boxes 61 to 63. It should be noted that the readers R11 to R14, R21 to R24, and R31 to R34 are not essential.

Further, in the shelf inventory management system according to the present embodiment, the consumables taken out are determined based on the mass change of each storage box 61 to 63. Therefore, as shown in FIG. 2, the shelf 50 is provided with the mass sensors (first sensor) MS1 to MS3 for each row. The mass sensors MS1 to MS3 may be installed at each storage location (for example, for each pair of the rails 53) so that the mass changes of the individual storage boxes 61 to 63 can be measured. However, as shown in FIG. 2, providing the mass sensor for each row can reduce the number of mass sensors.

Further, the shelf 50 does not necessarily have to be provided with the mass sensors, and the mass sensors may be provided separately from the shelf 50. When taking out the consumables from the storage boxes 61 to 63, for example, the storage boxes 61 to 63 may be placed on a mass sensor provided separately from the shelf 50 to measure the mass change of the storage boxes 61 to 63.

In the example of FIG. 2, when the consumables stored in either the two storage boxes 61 or the one storage box 62 accommodated in the row on the side in the y-axis negative direction are taken out, the mass detected by the mass sensor MS1 changes. When the consumables stored in either the two storage boxes 61 or the one storage box 62 accommodated in the central row are taken out, the mass detected by the mass sensor MS2 changes. When the consumables stored in either the one storage box 61 or the one storage box 63 accommodated in the row on the side in the y-axis positive direction are taken out, the mass detected by the mass sensor MS3 changes.

The mass change detected by the mass sensors MS1 to MS3 is the mass of the consumables taken out. The storage box 61 to 63 from which the consumables were taken out can be determined by detecting that the storage box 61 to 63 accommodated in the row in which the mass change is recognized is pulled out from the shelf 50. The fact that the storage box 61 to 63 is pulled out from the shelf 50 can be easily determined, for example, by detecting that the lock mechanism 54, which will be described later, has been released. It goes without saying that the above may be detected by the readers R11 to R14, R21 to R24, and R31 to R34, the camera 50a shown in FIG. 1, or other sensors.

As described above, the management unit 100 stores the identification information, masses, and the like of the consumables stored in the storage boxes 61 to 63. Therefore, the management unit 100 can determine the consumables taken out from the shelf 50 based on the mass change detected by the mass sensors MS1 to MS3. Further, the management unit 100 can determine from which of the storage boxes 61 to 63 the consumables were taken out by detecting that the lock mechanism 54, which will be described later, has been released.

Details of Rail 53 and Lock Mechanism 54

Figure 3:
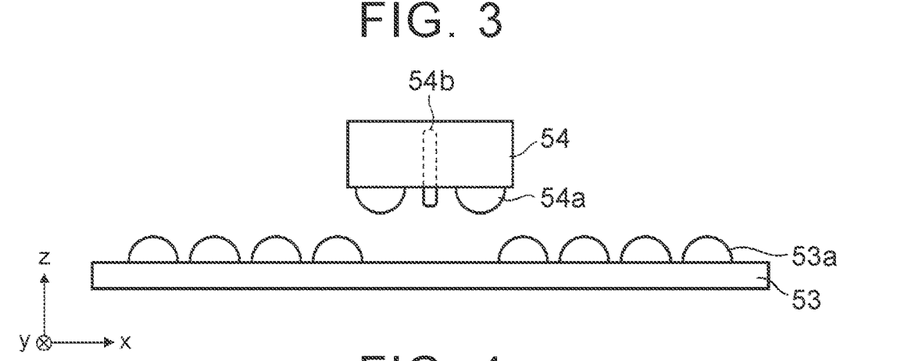
FIG. 3 is a schematic side view showing a rail 53 and a lock mechanism 54.
Figure 4:
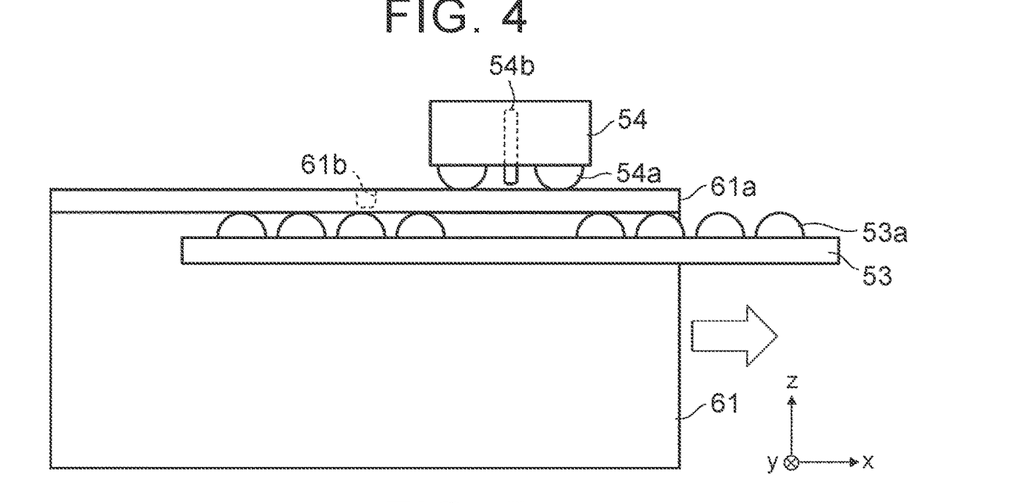
FIG. 4 is a schematic side view showing the rail 53 and the lock mechanism 54.
Figure 5:
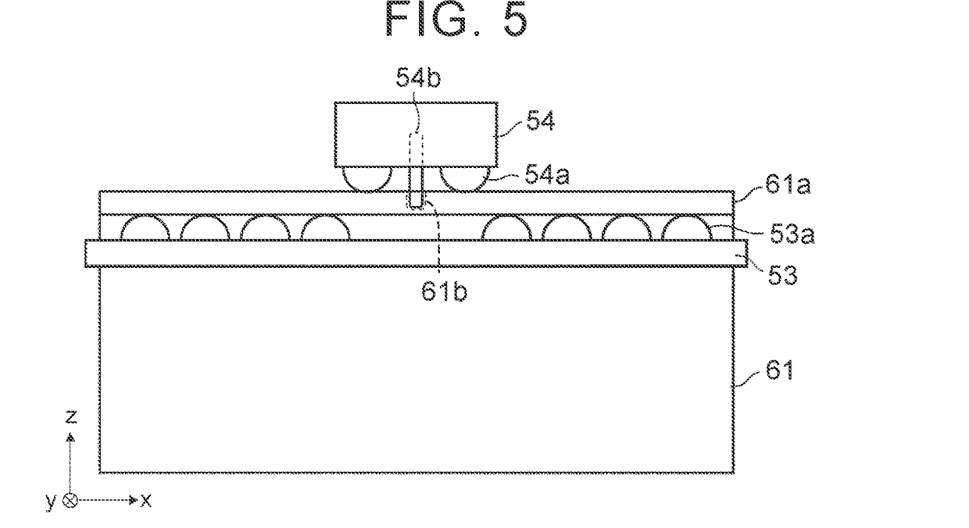
FIG. 5 is a schematic side view showing the rail 53 and the lock mechanism 54.

Here, the details of the rail 53 and the lock mechanism 54 will be described with reference to FIGS. 3 to 5. FIGS. 3 to 5 are schematic side views showing the rail 53 and the lock mechanism 54. FIGS. 3 to 5 show the positional relationship between the rail 53, the lock mechanism 54, and the storage box 61 as seen from the side in the y-axis negative direction in FIG. 2. The same applies to the positional relationship between the rail 53, the lock mechanism 54, and the storage box 62.

As shown in FIG. 3, the rail 53 is a roller rail and includes rollers 53a. The rollers 53a are made of, for example, plastic. The rollers 53a can reduce the friction coefficient between the protruding portion 61a of the storage box 61 and the rail 53, and can suppress the generation of abrasion powder due to the sliding of the protruding portion 61a.

The lock mechanism 54 shown in FIG. 3 is a solenoid lock and includes rollers 54a and a pin 54b. The lock mechanism 54 is provided so as to face each rail 53. As shown in FIGS. 4 and 5, the lock mechanism 54 is provided so as to slide with the protruding portion 61a of the storage box 61, and the rollers 54a are provided on the surface of the lock mechanism 54 that slides with the protruding portion 61a. The rollers 54a are made of, for example, plastic. The rollers 54a can reduce the friction coefficient between the protruding portion 61a of the storage box 61 and the lock mechanism 54, and can suppress the generation of abrasion powder due to the sliding of the protruding portion 61a.

As shown in FIG. 4, the lock mechanism 54 is released while the storage box 61 slides on the rail 53. Therefore, the pin 54b is retracted upward. On the other hand, as shown in FIG. 5, when the storage box 61 stops at a predetermined position on the rail 53, the lock mechanism 54 operates.

Specifically, the pin 54b advances downward and fits into a recess 61b provided in the protruding portion 61a of the storage box 61, whereby the storage box 61 is fixed to the housing 51 and the lid (not shown) of the storage box 61 is locked. As a matter of course, when the lock mechanism 54 is released, the storage box 61 can be moved again as shown in FIG. 4.

The lock mechanism 54 can prevent the storage box 61 and the consumables stored in the storage box 61 from being stolen. Further, the management unit 100 shown in FIG. 1 detects that the storage box 61 is locked. As a result, the management unit 100 can determine the rails 53 where the storage boxes 61 to 63 is accommodated. The storage box 61 is locked while the storage box 61 is accommodated in the shelf 50.

On the other hand, when taking out the consumables from the storage boxes 61 to 63, the management unit 100 shown in FIG. 1 detects that the locks of the storage boxes 61 to 63 have been released. That is, the management unit 100 detects that the storage box 61 to 63 has been pulled out from the shelf 50 (second sensor). As a result, the management unit 100 determines that the consumables have been taken out from the storage box 61 to 63 that has been pulled out.

The lock mechanism 54 is not limited to the solenoid lock, and may be any mechanism that can restrict the operation of the storage box 61 and lock the lid (not shown) of the storage box 61. For example, the pin 54b may operate mechanically. Alternatively, a rotary lock mechanism that does not use the pin 54b may be used. Further, the lock for the operation of the storage box 61 and the lock for the lid of the storage box 61 may be locked separately.

Shelf Inventory Management Method

Figure 6:
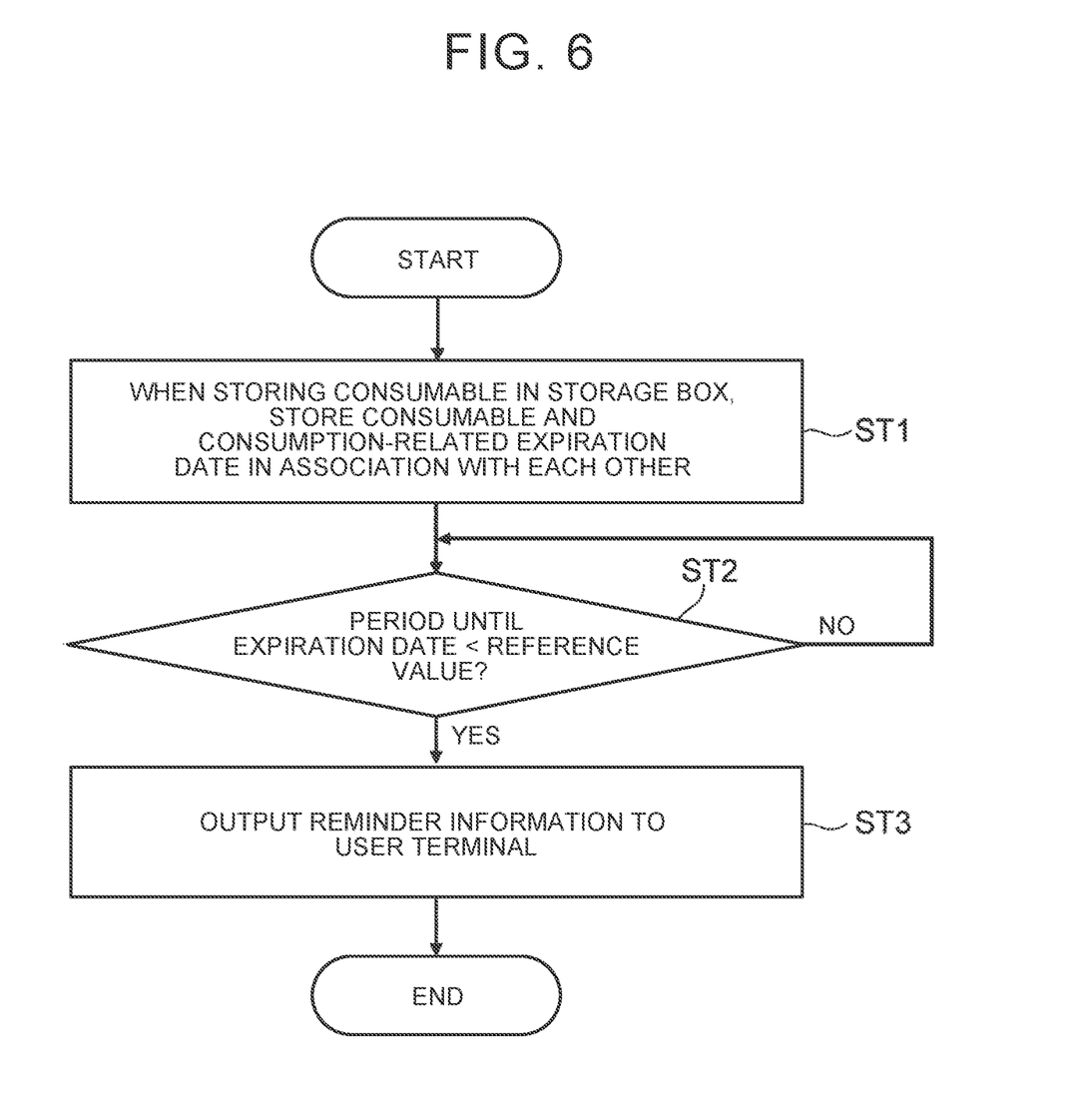
FIG. 6 is a flowchart showing a shelf inventory management method according to the first embodiment.

Next, a shelf inventory management method according to the first embodiment will be described with reference to FIG. 6. FIG. 6 is a flowchart showing the shelf inventory management method according to the first embodiment. First, as shown in FIG. 6, when the purchased consumable (purchased article) is stored in any of the storage boxes 61 to 63, the management unit 100 stores the consumable and its consumption-related expiration date in association with each other (step ST1). That is, as the inventory information of any of the storage boxes 61 to 63 in which the consumable is stored, the consumable and the consumption-related expiration date are managed in association with each other.

Next, the management unit 100 determines whether the period until the consumption-related expiration date of the consumable that remains in the inventory without being detected by the mass sensors MS1 to MS3 falls below a predetermined reference value (step ST2). When the period until the consumption-related expiration date does not fall below the reference value (step ST2: NO), the management unit 100 waits as it is until the period until the consumption-related expiration date falls below the reference value. On the other hand, when the period until the consumption-related expiration date falls below the reference value (step ST2: YES), the management unit 100 outputs the reminder information to the user terminal 70 notifying that the expiration date of the consumable is approaching (step ST3), and ends the management.

Here, the reminder information includes the storage box information indicating which of the storage boxes 61 to 63 the consumable with the approaching consumption-related expiration date is stored in. Each of the storage boxes 61 to 63 is identified by the identification information, and the storage location is also managed. Therefore, the user can specify the storage location of the consumable with the approaching consumption-related expiration date based on the reminder information, and can easily take out the consumable from the shelf 50. The reminder information can reduce consumables that are discarded without being consumed, such as food waste.

As described above, in the shelf inventory management method according to the present embodiment, when the period until the consumption-related expiration date of each consumable stored in each of the storage boxes 61 to 63 without being detected by the mass sensors MS1 to MS3 falls below the predetermined standard, the reminder information is output to the user terminal 70. The reminder information includes the storage box information indicating which of the storage boxes 61 to 63 the consumable with the approaching consumption-related expiration date is stored in. Therefore, the user can specify the storage location of the consumable with the approaching consumption-related expiration date based on the reminder information, and can easily take out the consumable from the shelf 50.

In the examples described above, various control programs can be stored using various types of non-transitory computer-readable media and supplied to a computer. The non-transitory computer-readable media include various types of tangible storage media. Examples of the non-transitory computer-readable media include magnetic recording media (e.g. flexible disks, magnetic tapes, hard disk drives), magneto-optical recording media (e.g. magneto-optical disks), compact disc ROM (CD-ROM), compact disc recordable (CD-R), compact disc rewritable (CD-R/W), and semiconductor memory (e.g. mask ROM, programmable ROM (PROM), erasable PROM (EPROM), flash ROM, RAM). The program may also be supplied to the computer by various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

The present disclosure is not limited to the above embodiments, and can be appropriately modified without departing from the spirit.

What is claimed is:

1. A shelf inventory management system comprising:
   a shelf including a plurality of storage boxes each of which is identified;
   a first sensor that detects a mass change of the plurality of storage boxes and outputs a detection result;
   a terminal; and
   a management unit communicatively coupled to each of the shelf, the first sensor, and the terminal, the management unit comprising a memory storing a program and a processor which executes the program and thereby:
      manages an inventory of an article stored in each of the plurality of storage boxes, based on the detection result received from the first sensor,
      stores, in the memory, information of an article stored in each of the plurality of storage boxes and an expiration date related to consumption of the article in association with each other, and
      outputs to the terminal reminder information for notifying that the expiration date of the article is approaching, and controls the terminal to indicate the reminder information, when a period until the expiration date of the article falls below a predetermined standard and removal of the article is not indicated by the detection result; and
      the reminder information includes storage box information indicating which of the plurality of storage boxes the article with the approaching expiration date is stored in.

2. The shelf inventory management system according to claim 1, wherein:
   the first sensor comprises a plurality of first sensors, wherein one of the plurality of first sensors is provided for each row of the shelf; and
   the shelf inventory management system further comprises a second sensor that detects that each of the plurality of storage boxes is pulled out from the shelf.

3. The shelf inventory management system according to claim 2, wherein:
   the shelf comprises a lock mechanism for locking each of the plurality of storage boxes, and each of the plurality of storage boxes is locked while the article is stored and unlocked when the article is taken in and out; and
   the second sensor detects that each of the plurality of storage boxes has been unlocked.

4. The shelf inventory management system according to claim 1, wherein:
   the terminal comprises a display unit configured to display the reminder information; and
   the reminder information further includes identification information of the article with the approaching expiration date, the expiration date of the article, and an amount of the article, and is collectively displayed on the display unit.

5. The shelf inventory management system according to claim 4, wherein the reminder information further includes a method of consuming the article with the approaching expiration date, and is collectively displayed on the display unit.

6. A shelf inventory management method comprising:
   detecting, by a first sensor, a mass change of a plurality of storage boxes stored on a shelf;
   managing an inventory of the article stored in each of the plurality of storage boxes based on a detection result output from the first sensor;
   storing, in a memory, information of an article stored in each of the plurality of storage boxes and an expiration date related to consumption of the article in association with each other; and
   outputting to a terminal reminder information for notifying that the expiration date of the article is approaching, and controlling the terminal to indicate the reminder information, when a period until the expiration date of the article falls below a predetermined standard, and removal of the article is not indicated by the detection result;
   wherein the reminder information includes storage box information indicating which of the plurality of storage boxes the article with the approaching expiration date is stored in.

7. The shelf inventory management method according to claim 6, wherein:
   the first sensor comprises a plurality of first sensors, wherein one of the plurality of first sensors is provided for each row of the shelf; and
   the method further comprises a second sensor configured to detect that each of the plurality of storage boxes is pulled out from the shelf.

8. The shelf inventory management method according to claim 7, wherein:
   each of the plurality of storage boxes is locked while the article is stored and unlocked when the article is taken in and out; and
   the method further comprises the second sensor detecting that each of the plurality of storage boxes has been unlocked.

9. The shelf inventory management method according to claim 6, wherein:
   the terminal includes a display unit able to display the reminder information; and
   the reminder information further includes identification information of the article with the approaching expiration date, the expiration date of the article, and an amount of the article, and is collectively displayed on the display unit.

10. The shelf inventory management method according to claim 9, wherein the reminder information further includes a method of consuming the article with the approaching expiration date, and is collectively displayed on the display unit.

11. A non-transitory computer-readable medium storing thereon a program for shelf inventory management method that causes a computer to perform a process comprising:
receiving, from a first sensor, a detection result of a detection of a mass change of a plurality of storage boxes in a shelf;
storing, in a memory, information of an article stored in each of the plurality of storage boxes and an expiration date related to consumption of the article in association with each other; and
outputting, to a terminal, reminder information for notifying that the expiration date of the article is approaching, and controlling the terminal to indicate the reminder information, when a period until the expiration date of the article falls below a predetermined standard and removal of the article is not indicated by the detection result;
wherein the reminder information includes storage box information indicating which of the plurality of storage boxes the article with the approaching expiration date is stored in.

* * * * *